(12) United States Patent
Gunsjö et al.

(10) Patent No.: US 11,988,236 B2
(45) Date of Patent: May 21, 2024

(54) THREADED JOINT ARRANGEMENT

(71) Applicant: Axis AB, Lund (SE)

(72) Inventors: Charlotte Gunsjö, Lund (SE); Jake Snowdon, Lund (SE); Jakob Beckerot, Lund (SE); Kristoffer Neutel, Lund (SE); Tony Carlson, Lund (SE); Joel Nilsson, Lund (SE)

(73) Assignee: AXIS AB, Lund (SE)

( * ) Notice: Subject to any disclaimer, the term of this patent is extended or adjusted under 35 U.S.C. 154(b) by 288 days.

(21) Appl. No.: 17/674,863

(22) Filed: Feb. 18, 2022

(65) Prior Publication Data

US 2022/0316515 A1  Oct. 6, 2022

(30) Foreign Application Priority Data

Apr. 1, 2021 (EP) .................................... 21166682

(51) Int. Cl.
*F16B 31/02* (2006.01)
(52) U.S. Cl.
CPC .................... *F16B 31/02* (2013.01)
(58) Field of Classification Search
CPC ......... F16B 31/02; F16B 31/028; F16B 43/00
USPC ........................... 411/8, 347, 371.2, 383, 552
See application file for complete search history.

(56) References Cited

U.S. PATENT DOCUMENTS

| | | | |
|---|---|---|---|
| 3,018,127 A * | 1/1962 | Dobrosielski | F16J 13/18 411/166 |
| 3,321,221 A | 5/1967 | Harris et al. | |
| 3,568,562 A | 3/1971 | Harwood et al. | |
| 5,052,793 A | 10/1991 | Lapp et al. | |
| 5,375,923 A | 12/1994 | Hall et al. | |
| 6,588,543 B1 | 7/2003 | Tchilinguirian | |
| 6,908,252 B1 | 6/2005 | Rubano | |
| 7,628,366 B2 | 12/2009 | Scott | |
| 8,434,983 B2 * | 5/2013 | Chen | F16B 5/0208 411/347 |
| 8,454,290 B2 * | 6/2013 | Schaser | F16F 1/328 411/902 |

(Continued)

FOREIGN PATENT DOCUMENTS

| | | |
|---|---|---|
| EP | 0529405 A1 | 3/1993 |
| EP | 3715648 A1 | 9/2020 |

(Continued)

*Primary Examiner* — Roberta S Delisle
(74) *Attorney, Agent, or Firm* — XSENSUS LLP (57) ABSTRACT

A threaded joint arrangement with visual and tactile indication of correct tightening force, includes a threaded fastener having a fastener shaft and a fastener head, a biasing member, a first object provided with a cavity in a reference surface with a bottom surface provided with a through hole, and a second object with a threaded hole. The through hole is aligned with the threaded hole and the fastener shaft extends through the through hole and is in threaded engagement with the threaded hole. The biasing member is arranged in the cavity between the fastener head and the bottom surface and is compressed between the fastener head and the bottom surface in response to rotation of the threaded fastener. An alignment surface is movable by rotation of the threaded fastener between a first position outside the cavity, a second position flush with the reference surface and a third position inside cavity.

13 Claims, 8 Drawing Sheets

(56) References Cited

U.S. PATENT DOCUMENTS

| | | | |
|---|---|---|---|
| 8,641,344 B1 * | 2/2014 | Avetisian | ............... F16B 39/32 |
| | | | 411/347 |
| 10,781,967 B1 | 9/2020 | DeCosta | |
| 2009/0311066 A1 | 12/2009 | Utille | |
| 2014/0305734 A1 | 10/2014 | Ivey et al. | |
| 2020/0124540 A1 * | 4/2020 | Gao | ...................... F16M 13/00 |
| 2020/0186902 A1 | 6/2020 | Brousseau | |

FOREIGN PATENT DOCUMENTS

| | | |
|---|---|---|
| FR | 2906854 A1 | 4/2008 |
| GB | 870946 A | 6/1961 |
| GB | 2306601 A | 5/1997 |
| WO | 2005/027761 A1 | 3/2005 |
| WO | 2017/205929 A2 | 12/2017 |

\* cited by examiner

THREADED JOINT ARRANGEMENT

CROSS-REFERENCE TO RELATED APPLICATION

This application claims priority to European Patent Application No. 21166682.1, filed on Apr. 1, 2021, the entire disclosure of which is incorporated by reference herein.

FIELD OF THE INVENTION

The present invention relates to a threaded joint arrangement and more specifically to a threaded joint arrangement with visual and tactile indication of correct tightening force, the threaded joint arrangement being configured for joining two objects by means of a threaded fastener such as a screw or a bolt.

BACKGROUND ART

Threaded fasteners such as screws or bolts are commonly used for joining objects and may be used in threaded joint arrangements of various kinds.

For instance, the threaded fastener may be used for displacing two objects towards each other for clamping an intermediate structure.

Alternatively, the threaded fastener may be used for pressing two objects towards each other, if appropriate with an intermediate object arranged between the two objects.

When joining two objects by means of a threaded fastener, it is generally important that the threaded fastener is tightened with a correct tightening force. A too weak tightening force may cause the two objects to not become properly joined, and a too strong tightening force may cause damage to the objects or to any intermediate object placed therebetween. This is especially a problem if any of the objects is made of a fragile material, such as plastic.

In order to ensure application of a correct tightening force, the threaded fastener may be tightened by a tool such as a torque wrench. However, such a tool may be cumbersome to use in confined spaces and may also not always be available.

A device for displaying the correct tightening force is disclosed in US2009/0311066A1. The device is used with a structure comprising a screw and a nut for assembling two elements and comprises a non-deformable washer and a display washer made of elastically deformable material. When the nut is tightened for assembling the two elements, the washers are pressed against the two elements causing the display washer to be crushed such that it protrudes peripherally and thereby constitutes an indicator of proper tightening. Further related background art can be found in U.S. Pat. No. 3,321,221 A.

SUMMARY OF THE INVENTION

In view of that stated above, the object of the present invention is to provide a threaded joint arrangement enabling joining two objects by means of a threaded fastener with a predetermined tightening force.

To achieve at least one of the above objects and also other objects that will be evident from the following description, a threaded joint arrangement having the features defined in claim 1 is provided according to the present invention. Preferred embodiments will be evident from the dependent claims.

More specifically, there is provided according to a first aspect of the present invention a threaded joint arrangement with visual and tactile indication of correct tightening force, the threaded joint arrangement comprising a threaded fastener having a fastener shaft and a fastener head, a biasing member, a first object provided with a cavity recessed in a reference surface of the first object, wherein the cavity has a bottom surface provided with a through hole, and a second object provided with a threaded hole. The through hole is aligned with the threaded hole, wherein the threaded fastener is arranged such that the fastener shaft extends through the through hole and is in threaded engagement with the threaded hole of the second object. The biasing member is arranged in the cavity between the fastener head and the bottom surface of the cavity, wherein the biasing member is configured to be compressed between the fastener head and the bottom surface of the cavity in response to rotation of the threaded fastener in a tightening direction. An alignment surface of the threaded joint arrangement is movable by rotation of the threaded fastener between a first position in which the alignment surface is positioned outside the cavity and a second position in which the alignment surface is flush with the reference surface. The biasing member has a spring constant configured such that a tightening force of a predetermined level is obtained when the alignment surface is in the second position.

Hereby a threaded joint arrangement is provided which enables visual and tactile indication of correct tightening force.

That is, the applied tightening force may be determined visually or tactilely simply by observing or touching the threaded joint arrangement and registering the relationship between the alignment surface and the reference surface.

If the alignment surface is flush with the reference surface, i.e. is in the second position, this will indicate that the applied tightening force corresponds to the predetermined level. Consequently, it will be possible for a person using the threaded joint arrangement to get an immediate feedback when the predetermined tightening force has been reached, thereby making it possible to avoid applying a too strong tightening force. Hereby it may be possible to avoid damage caused by a too high tightening force. This is important especially if the first and/or the second object is made of a fragile material, for instance a plastic material such as halogen-free plastics.

If the alignment surface is positioned outside the cavity, i.e. in the first position, this will indicate that the applied tightening force is insufficient potentially resulting in a too loose joining of the first and second object, which over time may cause the two objects to come apart.

The alignment surface is further movable by rotation of the threaded fastener between the second position and a third position in which the alignment surface is positioned inside the cavity. By allowing movement of the alignment surface to a position inside the cavity, it will be possible to even after completed installation to determine whether a tightening force of predetermined level has been applied. More specifically, if the alignment surface is in the third position, this provides a visual and tactile indication of that the applied tightening force is too strong. Also, the provision of a third position allows a marginal of overtightening. In a typical scenario where an electrical screwdriver is used for tightening the threaded joint arrangement, it may be difficult for the user to hit exactly the second position. The marginal allows a slightly overtightening as a first step followed by a slower untightening to reach the second position of the alignment surface.

According to an embodiment, the alignment surface may be a fastener head surface of the threaded fastener. Hereby, a simple threaded joint arrangement is provided with a minimum number of parts. Alternatively, the alignment surface may be a top end surface of a member connected to the threaded fastener. Hereby the threaded joint arrangement may be utilized in applications where the reference surface is not parallel with the fastener head surface.

According to an embodiment, the first object and the second object may be movable relative to each other by means of rotation of the threaded fastener such that a structure is clampable between the first and second object.

The first object may comprise a first engagement surface and the second object may comprise a second engagement surface facing the first engagement surface, wherein, upon relative movement of the first and second objects towards each other by rotation of the threaded fastener in the tightening direction, the first engagement surface is configured for engagement with a first structure surface of the structure and the second engagement surface is configured for engagement with a second structure surface of the structure opposing the first structure surface. That is, the threaded joint first assumes a non-clamping state in which the first and second objects are moved towards each other in response to rotation of the threaded fastener in the tightening direction. Once the first and second objects engage the substrate, continued rotation of the threaded fastener in the tightening direction will cause the threaded joint arrangement to assume a clamping state, during which the alignment surface starts moving from the first position to the second position and the biasing member is compressed.

The second object may also be movable, by rotation of the threaded fastener in the tightening direction, from a mounting position in which the second object is positioned within a lateral periphery of the first object to a clamping position in which the second object extends beyond the lateral periphery of the first object, and in which the second object is relatively movable in a direction parallel with a longitudinal extension of the threaded fastener towards the first object upon continued rotation of the threaded fastener in the tightening direction. Hereby, the threaded joint arrangement may be insertable into an opening provided in the substrate with the second object arranged in the mounting position, whereafter rotation of the threaded fastener will cause the second object to be moved to the clamping position and allowing clamping of the substrate by continued rotation of the threaded fastener.

According to an embodiment, the first object and the second object may be configured to be pressed towards each other in response to compression of the biasing member by means of rotation of the threaded fastener in the tightening direction. Hereby the first and second object may be joined with, if appropriate, one or more intermediate objects arranged between the two objects.

According to an embodiment, the first object may be provided with a protrusion extending into the cavity from the bottom surface without interfering with the biasing member or the fastener shaft. Hereby a stop may be provided preventing compression of the biasing member below its working height, thereby avoiding causing permanent damage to the biasing member when rotating the threaded fastener.

The biasing member may be a compression spring, for instance a wave spring. The use of a compression spring is a cost-effective way of providing a biasing member with high reliability over time. A compression spring may also provide a linear compression force when tightening the threaded joint arrangement.

The alignment surface may be parallel with the reference surface. By ensuring that the alignment surface is parallel with the reference surface, it becomes possible for the alignment surface to become flush with the reference surface in the second position of the alignment surface regardless of the extension of the reference surface, which may be perpendicular or otherwise inclined relative the longitudinal extension of the threaded fastener, or curved.

According to an embodiment, the first object and/or the second object is made at least partly of a plastic material.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1b is a top view of the device shown in FIG. 1a.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
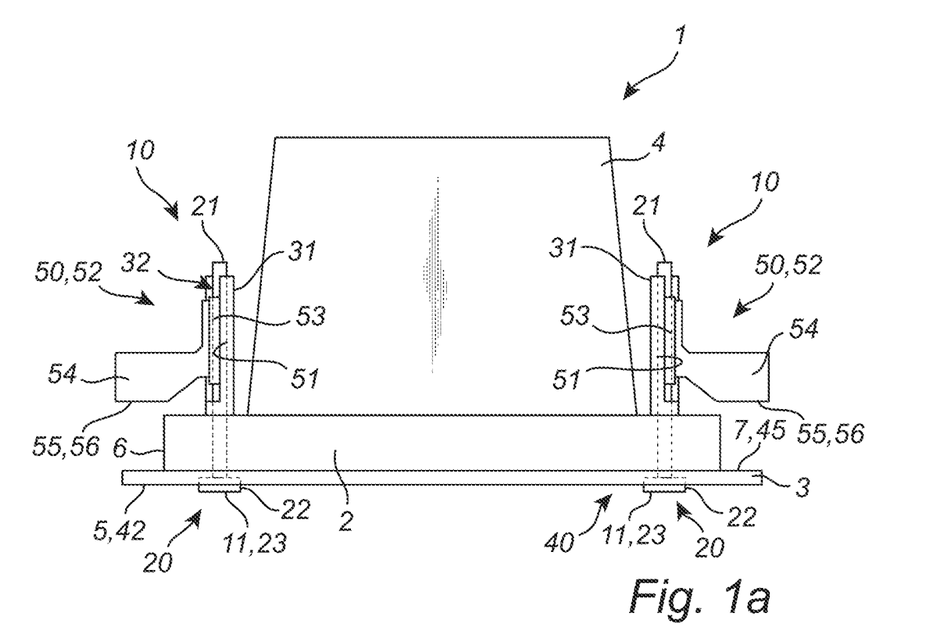
FIG. 1a is a side view illustrating a device comprising two threaded joint arrangements.
Figure 1B:
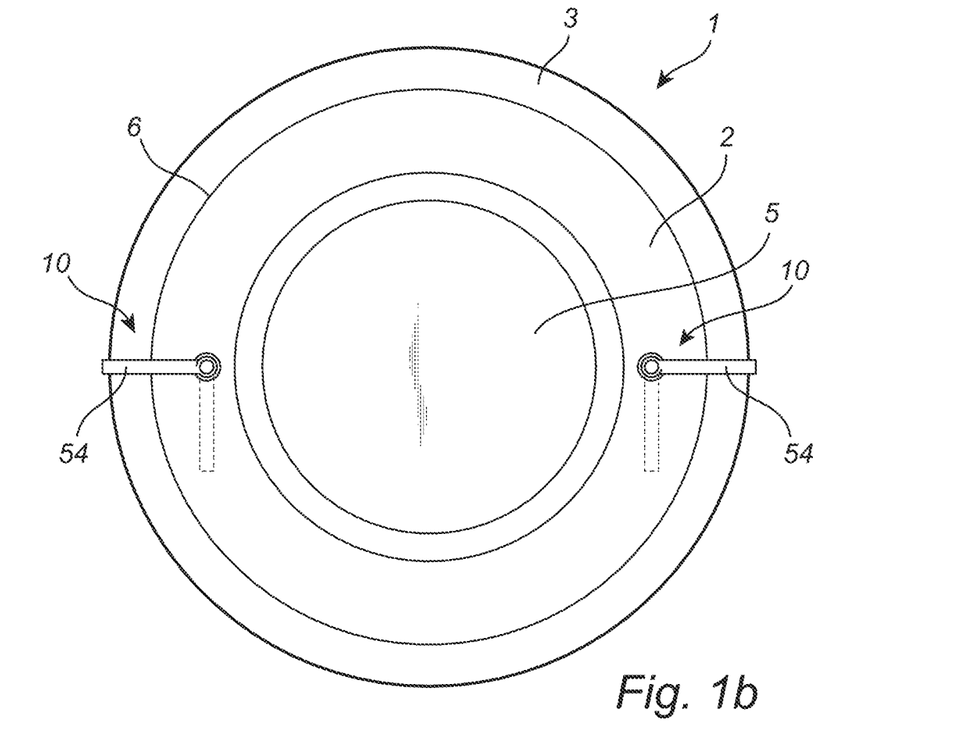

FIGS. 1a-b disclose a device 1 provided with two threaded joint arrangements 10 in accordance with the present invention.

The device 1 shown in the figures is configured for recessed mounting in a structure such as a ceiling. Electronic equipment, such as a speaker, a sensor unit, or a camera, may be housed inside the device.

The device 1 comprises a base 2 provided with a lower annular flange 3, which base 2 supports a housing 4.

The device 1 is configured for recessed mounting in the structure by inserting the base 2 and the housing 4 into an opening of the structure such that annular flange 3 abuts a first structure surface of the structure facing the insertion side. The threaded joint arrangements 10 are used for securing the device 1 when inserted into the opening.

Each threaded joint arrangement 10 is provided with visual and tactile indication of correct tightening force and comprises a threaded fastener 20 having a fastener shaft 21 and a fastener head 22, and a biasing member (not shown). In the shown embodiments, the threaded fastener 20 is a screw or bolt.

Each threaded joint arrangement 10 further comprises a first object 40 which is provided with a cavity (not shown) recessed in a reference surface 42 of the first object 40, wherein the cavity has a bottom surface provided with a through hole, and a second object 50 provided with a threaded hole 51.

In the shown embodiment, the first object 40 is formed by the base 2 which is provided with two cavities, i.e. one cavity for each threaded joint arrangement 10. A lower surface 5 of the base 2 forms the reference surface 42 for each threaded joint arrangement 10. The reference surface 42 extends in the shown embodiment in a plane perpendicular to the longitudinal extension of the threaded fastener 20. However, the reference surface may have other extensions.

The second object 50 is formed by two clamping members 52, i.e. one clamping member 52 for each threaded fastener 20. Each clamping 52 member comprises a body 53 provided with the threaded hole 51 and a leg member 54 adjoining the body 53 and extending in a radial direction relative to the longitudinal extension of the threaded hole 51.

In the shown embodiment, each threaded joint arrangement 10 further comprises a hollow protrusion 31 arranged on a top side of the base 2. Each protrusion 31 is aligned with the associated through hole and forms an extension thereof.

Each hollow protrusion 31 houses the body 53 of the associated clamping member 52. More specifically, each body 43 is arranged in the interior of the hollow protrusion 31 such that the threaded hole 51 of the body 53 is aligned with the trough hole of the first object 40.

Further, each hollow protrusion 31 is provided with an elongated opening 32 extending in the longitudinal direction of the protrusion 31 and allowing the leg member 54 of the clamping member 52 to extend in a lateral direction.

The threaded fastener 20 of each screw joint arrangement 10 is arranged such that the fastener shaft 21 extends through the through hole of the first object 40, i.e. the base 2, and is in threaded engagement with the threaded hole 51 of the second object 50, i.e. the clamping member 51.

The biasing member of each threaded joint arrangement 10 is arranged in the cavity between the fastener head 22 and the bottom surface of the cavity, wherein the biasing member is configured to be compressed between the fastener head 22 and the bottom surface of the cavity in response to rotation of the threaded fastener 20 in a tightening direction. This will be explained more in detail below with reference to FIG. 2.

An alignment surface 11 of each threaded joint arrangement 10 is movable by rotation of the threaded fastener 20 between a first position in which the alignment surface 11 is positioned outside the associated cavity and a second position in which the alignment surface 11 is flush with the reference surface 42, wherein the biasing member has a spring constant configured such that a tightening force of a predetermined level is obtained when the alignment surface 11 is in the second position. The alignment surface 11 of each threaded joint arrangement 10 is shown in the first position in FIG. 1a.

In the shown embodiment, the alignment surface 11 of each threaded joint arrangement 10 is formed by an upper fastener head surface 23 of the associated threaded fastener 20.

The fastener head 22 of each threaded joint arrangement 10 is biased by means of the biasing member towards the first position in a non-clamping state of the threaded joint arrangement 10.

The second object 50, i.e. the clamping member 52, of each threaded joint arrangement 10 is movable, by rotation of the threaded fastener 20 in a tightening direction, from a mounting position in which the second object 50 is positioned within a lateral periphery of the first object 40 to a clamping position in which the second object 50 extends beyond the lateral periphery of the first object 40. In the shown embodiment, the lateral periphery of the first object 40 is formed by the circumferential side edge 6 of the base 2. In the shown embodiment, the elongated opening 32 of the hollow protrusion 31 of each threaded joint arrangement 10 is configured such that each leg member 54 of the clamping members 52 may be turned by rotation of the associated threaded fastener 20 between the mounting position, in which the leg member 54 is positioned within the circumferential side edge 6 of the base 2, and the clamping position, in which the leg member 54 extends beyond the circumferential side edge 6 of the base 2. The clamping position of the leg members 54 is shown in FIG. 1b, and the mounting position is shown by dashed lines.

Further, the first object 40 and the second object 50 of each threaded joint arrangement 10 are in the shown embodiment movable relative to each other by means of rotation of the threaded fastener 20 such that the structure is clampable between the first object 40 and second object 50. In the shown embodiment, the second object 50, i.e. the clamping member 52, of each threaded joint arrangement 10 is movable towards the first object 40, i.e. the base 2, by rotation of the threaded fastener 20 in the tightening direction.

More specifically, the first object 40 of each threaded joint arrangement 10 comprises a first engagement surface 45 and the second object 50 comprises a second engagement surface 55 facing the first engagement surface 45, wherein, upon relative movement of the first object 40 and second object 50 towards each other by rotation of the threaded fastener 20 in the tightening direction, the first engagement surface 45 is configured for engagement with a first structure surface of the structure and the second engagement surface 55 is configured for engagement with a second structure surface of the structure opposing the first structure surface. In the shown embodiment, the first engagement surface 45 is formed by an upper flange surface 7 of the lower annular flange 3 of the base 2, and the second engagement surface 55 is formed by a bottom surface 56 of the leg member 54.

When the first engagement surface 45 and the second engagement surface 55 engages with the first structure surface and second structure surface, respectively, i.e. when the structure is clamped, each threaded joint arrangement 10 assumes a clamping state and continued rotation of the threaded fastener 20 will move the fastener head 22 from the first position towards the second position, thereby causing the biasing member to be compressed.

Figure 2:
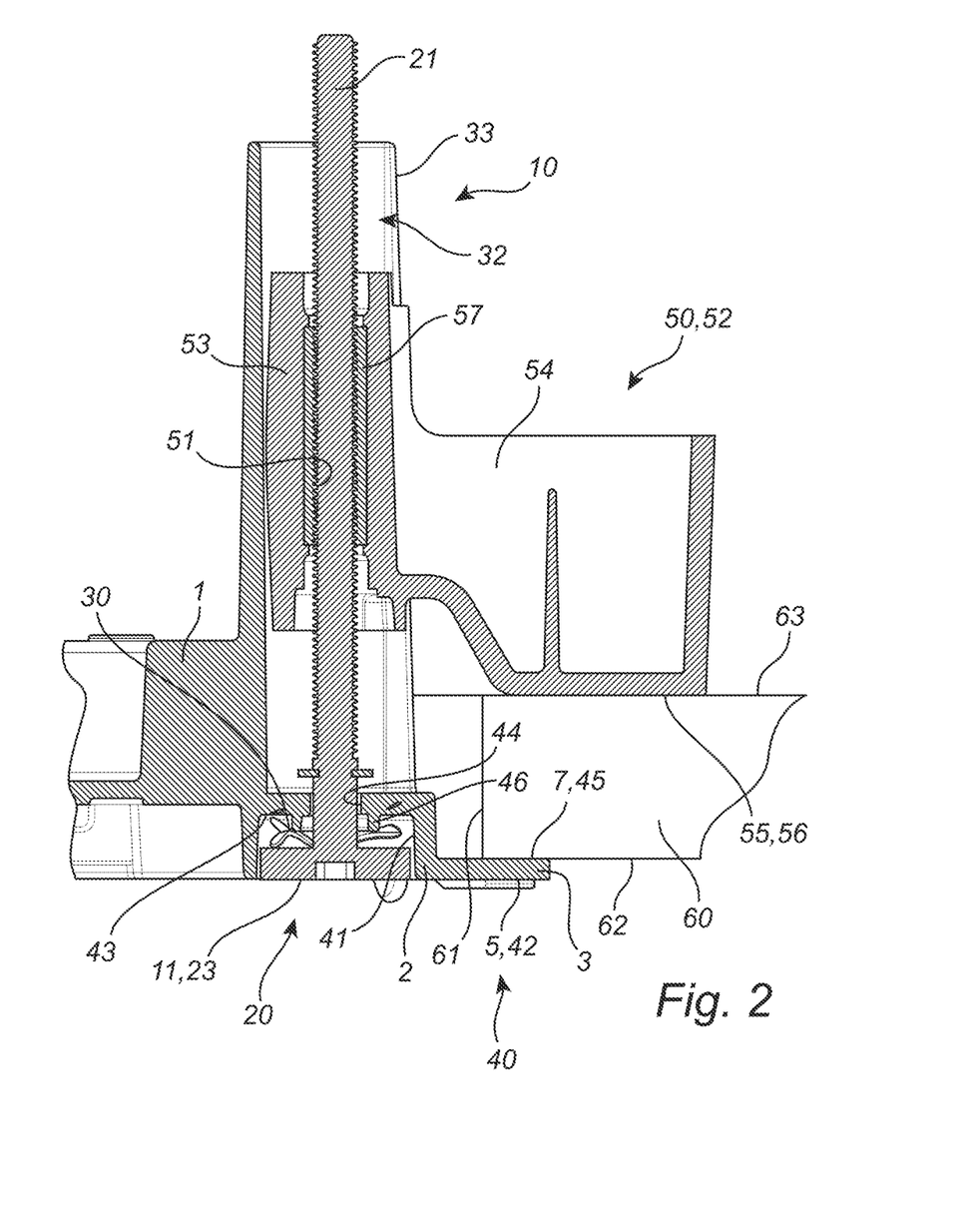
FIG. 2 is a detached cross-sectional view illustrating a device mounted in an opening of a structure by means of a threaded joint arrangement clamping the structure.

In FIG. 2, to which reference now is made, a threaded joint arrangement 10 of the type described above is shown in more detail. The threaded joint arrangement 10 is used for securing a device 1 mounted in an opening 61 of a structure 60, such as a ceiling.

As evident from the figure, the second object 50, i.e. the clamping member 52, comprises a threaded bushing 57 which is arranged inside the body 53. The threaded bushing 57 forms the threaded hole 51 of the second object 50 and may be arranged inside the body 53 in a moulding operation for forming the clamping member 52.

The threaded bushing 57 may be made of a metallic material and the clamping member 52 may be made of plastics.

The threaded hole 51 formed by the threaded bushing 57 is aligned with the trough hole 44 provided in the bottom surface 43 of the cavity 41. The fastener shaft 21 of the threaded fastener 20 extends through the through hole 44 and is in threaded engagement with the treaded bushing 57.

The leg member 54 of the clamping member 52 is as described above movable from the mounting position to the clamping position by initial rotation of the threaded fastener 20 in the tightening direction. During this movement, the clamping member 52 will be turned together with the threaded fastener 20. When the leg member 54 has reached the clamping position, a side edge 33 of the longitudinal opening 32 of the protrusion 31 will engage the leg member 54 and prevent further turning thereof, and the treaded engagement between the fastener shaft 21 and the clamping member 52 will cause the clamping member 52 to be moved towards the first object 40, i.e. the base 2, in response to continued rotation of the threaded fastener 20 in the tightening direction.

In the shown embodiment, the threaded joint arrangement 10 has assumed the clamping state, i.e. the first engagement surface 45 of the first object 40 formed by the upper flange surface 7 of the lower annular flange 3, and the second engagement surface 55 of the second object 50, i.e. the bottom surface 56 of the leg member 54, are in engagement with the first surface structure 62 and second structure surface 63, respectively. Also, the alignment surface 11, i.e. the fastener head surface 23 according to the shown embodiment, has been moved by rotation of the threaded fastener 20 to the second position in which the alignment surface 11 is flush with the reference surface 42, i.e. the lower surface 5 of the base 2. As a consequence, the biasing member 30 has been compressed between the fastener head 22 and the bottom surface 43 of the cavity 41. As explained above, the biasing member 30 has a spring constant configured such that a tightening force of a predetermined level is obtained when the alignment surface 11 is in the second position. The predetermined level preferably corresponds to a correct tightening force for the application at hand. Hereby it becomes possible to determine, both visually and tactilely, whether a correct tightening force has been applied simply by looking at or touching the threaded joint arrangement 10.

In the shown embodiment, the biasing member 30 is a compression spring in the form of a wave spring. It is understood that other types of biasing members are conceivable.

In the shown embodiment, the fastener head 22 is movable by continued rotation of the threaded fastener 20 in the tightening direction from the second position to a third position in which the alignment surface 11 is positioned inside the cavity 41. Hereby, the biasing member 30 may be further compressed thereby generating a greater tightening force.

The threaded joint arrangement 10 may comprise a projection 46 which extends into the cavity 41 from the bottom surface 43 without interfering with the biasing member 30 or the fastener shaft 21. In the shown embodiment, the projection 46 in formed by an annular rim enclosing the through hole 44. The projection 46 provides a stop for the fastener head 22 in connection of movement of the alignment surface 11 to the third position and may be configured to prevent compression of the biasing member 30 below a working height thereof, i.e. to avoid compression of the biasing member to an extent that may cause permanent damage to the biasing member.

Thus, when the screw joint arrangement 10 is operated, i.e. by rotation of the threaded fastener 20 in the tightening direction, for pressing the first object 40 and second object 50 towards each other, which in the shown embodiment corresponds to the clamping state of the threaded joint arrangement 10, the alignment surface 11, i.e. the upper fastener head surface 23, is movable between the first and second position and, optionally, also the third position. As a result, a visual and tactile indication of correct tightening force is obtainable. That is, the applied tightening force may be determined visually or tactilely either in connection with or after installation simply by observing or touching the threaded joint arrangement 10 and registering the relationship between the alignment surface 11 and the reference surface 42. This is illustrated in FIGS. 3a-c, to which reference now is made.

Figure 3A:
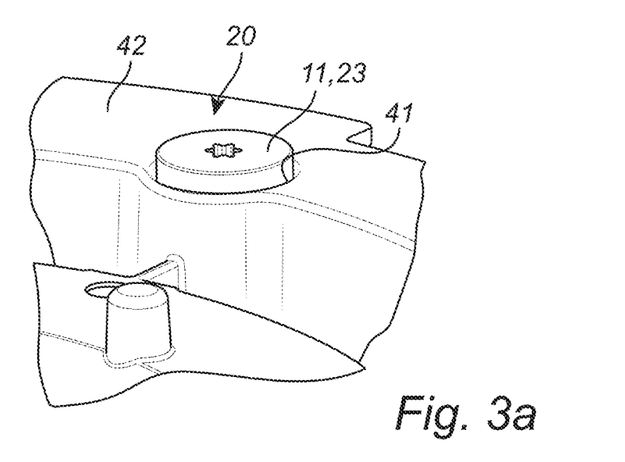
FIGS. 3a-c are detached perspective views illustrating a threaded joint arrangement with an alignment surface in a first, a second and a third position, respectively.

In FIG. 3a, the alignment surface 11 is in the first position, i.e. the fastener head surface 23 is positioned outside the cavity 42 which indicates a too weak tightening force having been applied.

Figure 3B:
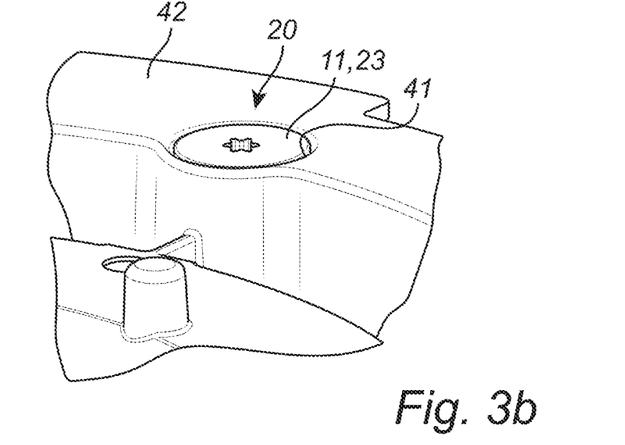

In FIG. 3b, the alignment surface 11 is in the second position, i.e. the fastener head surface 23 is flush with the reference surface 42 which indicates a correct tightening force having been applied.

Figure 3C:
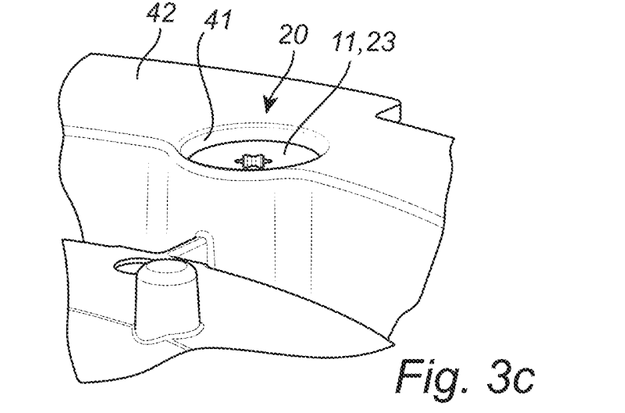

In FIG. 3c, the alignment surface 11 is in the third position, i.e. the fastener head surface 23 is positioned inside the cavity 41, which indicates a too strong tightening force having been applied.

Figure 4:
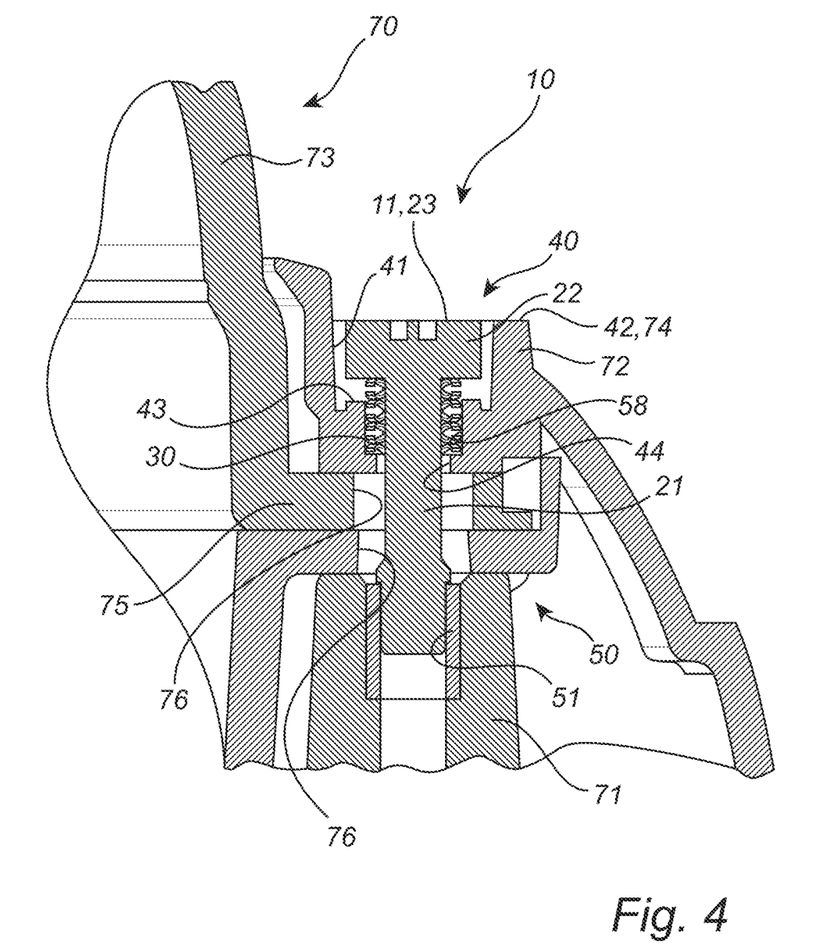
FIG. 4 is a detached cross-sectional view illustrating a camera device assembled by means of a threaded joint arrangement.

Another embodiment of the threaded joint arrangement 10 is shown in FIG. 4. In this embodiment, the threaded joint arrangement 10 is used for pressing a first object 40 and a second object 50 against each other with an intermediate object arranged therebetween. In the shown embodiment, the threaded joint arrangement 10 is used for assembling a camera device 70 and the figure illustrates a detached cross section of the camera device 70 which comprises a camera base 71 forming the second object 50, an annular collar 72 forming the first object 40 and a dome window 73 forming the intermediate object.

The annular collar 72 has an upper surface 74 forming the reference surface 42, and the cavity 41 is recessed in the upper surface 74. The threaded hole 51 in the camera base 71 is aligned with the through hole 44 in the bottom surface 43 of the cavity 41.

In the shown embodiment, the upper surface 74 of the annular collar 72 extends in a plane perpendicular to the longitudinal extension of the threaded fastener 20.

The intermediate object, i.e. the dome window 73, has an annular dome flange 75 provided with a flange through hole 76 which is aligned with the through hole 44 and the threaded hole 51.

The bottom surface 43 of the cavity 51 is provided with a recess 58 for accommodating a bottom portion of the biasing member 30 which in the shown embodiment is a wave spring.

The fastener shaft 21 extends through the through hole 44 of the cavity 41, through the flange through hole 76 of the annular dome flange 75 and is in threaded engagement with the threaded hole 51 of the camera base 71. The threaded fastener 20 has been rotated in the tightening directions such that the alignment surface 11 has been moved to the second position, i.e. such that the fastener head surface 23 of the fastener head 22 is flush with the reference surface 42, and as a consequence the biasing member 30 has been compressed in a predetermined extent to generate a predetermined tightening force.

By the compression of the biasing member 30, the first and second objects 40, 50 will be pressed against each other with the intermediate object arranged therebetween.

By choosing an appropriate spring constant of the biasing member 30 it may thus be ensured that a predetermined tightening force is obtained when the alignment surface 11 is flush with the reference surface 42. Hereby, the threaded joint arrangement 10 may be configured to give an indication of correct tightening force and thus also to indicate that the intermediate object is clamped between the first and second objects 40, 50 with an appropriate force.

Figure 5:
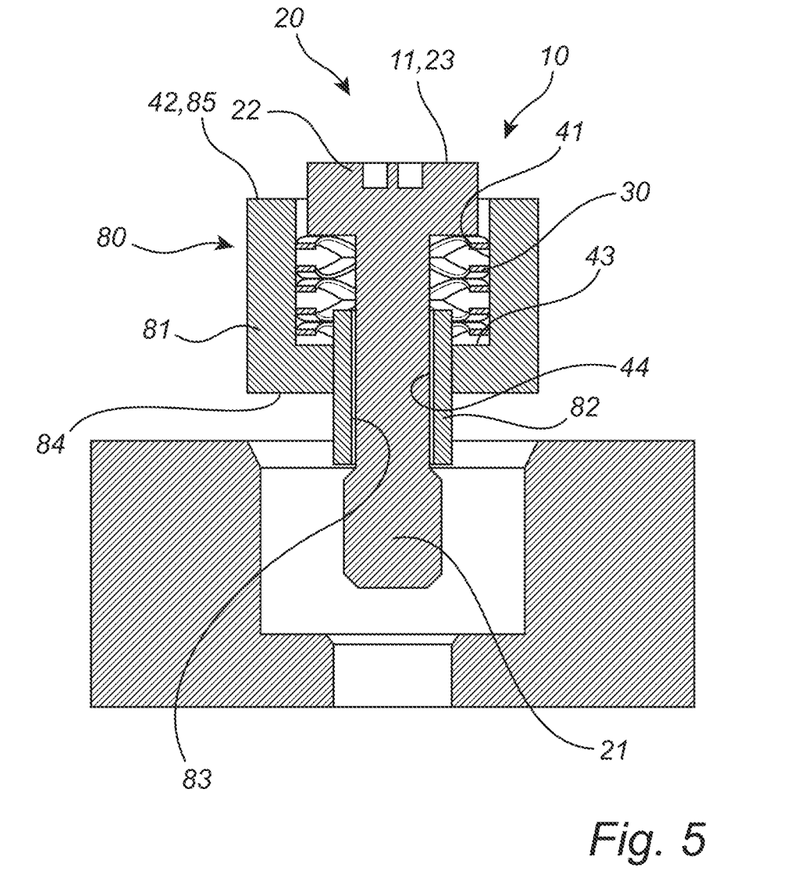
FIG. 5 is a cross-sectional view illustrating a module of a threaded joint arrangement comprising a threaded fastener enclosed by a sleeve.

In FIG. 5, another embodiment of the threaded joint arrangement 10 is illustrated. In this embodiment, the threaded joint arrangement 10 comprises a sleeve 80 enclosing the threaded fastener 20, and thus the threaded fastener 20 and the sleeve 80 forms a module. The module may be used for joining a first object 40 and second object 50 with one or more intermediate objects arranged between the first and second objects.

The sleeve 80 comprises a cylindrical top portion 81 provided with the cavity 41 and a cylindrical bottom portion 82 having a diameter which is smaller than the diameter of the top portion 81. The bottom portion 82 is provided with a through hole 83 forming an extension of the through hole 44 provided in the bottom surface 43 of the cavity 41.

The sleeve 80 exhibits an annular heel 84 formed by the difference in diameter between the top portion 81 and the bottom portion 82.

The reference surface 42 of the first object 40 may be formed by a top surface 85 of the sleeve 80.

Figure 6:
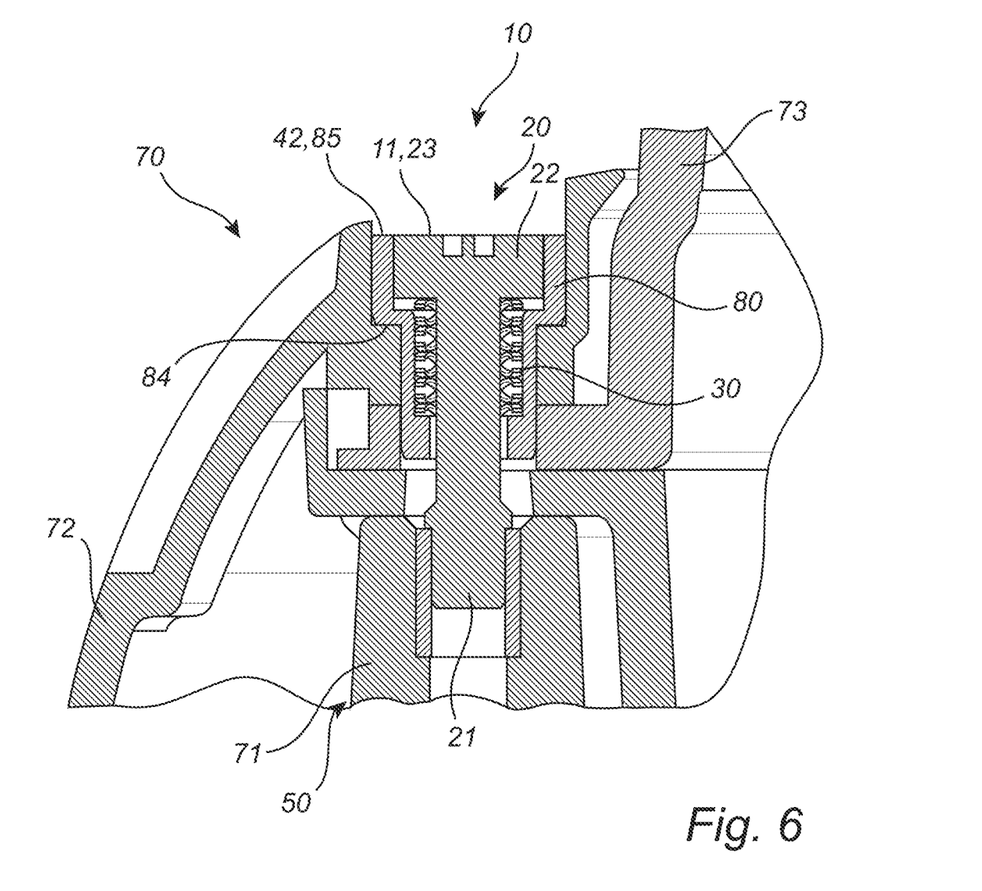
FIG. 6 is a detached cross-sectional view illustrating a camera device assembled by means of a threaded joint arrangement comprising a module of the type shown in FIG. 5.

The module described above may be used for assembling a camera device 70 of the type described above with reference to FIG. 4 and this is illustrated in FIG. 6.

In this embodiment, the first object 40 is solely formed by the sleeve 80 and the second object 50 is formed by the camera base 71 while the annular collar 72 and the dome window 73 form the intermediate objects. As evident from the figure, the annular heel 84 is configured for engagement with the annular collar 72.

In the shown embodiment, the alignment surface 11 has been moved by rotation of the threaded fastener 20 in the tightening direction to the second position such that the biasing member 30 is compressed and the fastener head surface 23 is flush with the reference surface 42, i.e. the top surface 85 of the sleeve 80, thereby indicating that a tightening force of a predetermined level has been applied.

The sleeve 80 and camera base 71 are thus pressed against each other with the annular collar 72 and the dome window 73 arranged therebetween.

However, it is understood that the first object 40 may be formed by the sleeve in combination with other parts. For instance, the first object may also include the annular collar in which case the reference surface of the first object may be formed by the upper surface of the annular collar.

In the embodiments described above, the reference surface 42 has been disclosed as extending in a plane perpendicular to the longitudinal extension of the threaded fastener 20. However, it is understood that the reference surface 42 may be inclined at another angle. Also, the reference surface 42 may be curved in which case the alignment surface 11 may have a corresponding curvature.

The alignment surface 11 of the threaded joint arrangement 10 may extend in a plane parallel with the reference surface 42. Hereby it may be ensured that the alignment surface 11 becomes flush with the reference surface 42 in the second position, no matter whether the reference surface 42 is perpendicular or inclined to the longitudinal extension of the threaded fastener 20 or if the reference surface 42 is curved.

Figure 7:
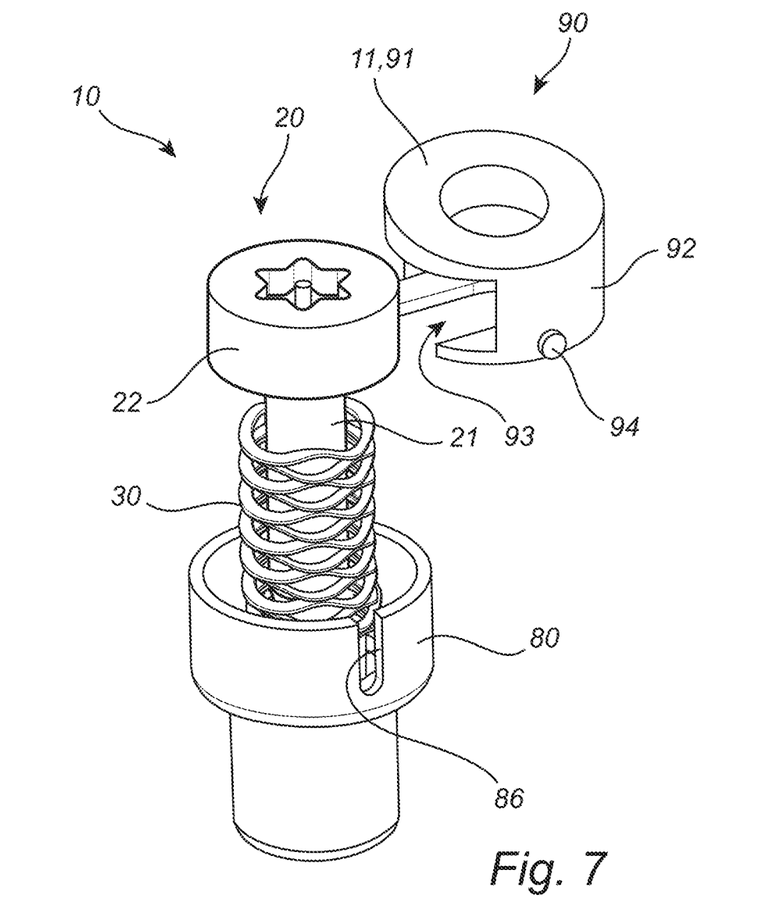
FIG. 7 is a perspective view illustrating a module of a threaded joint arrangement comprising a threaded fastener enclosed by a sleeve and an alignment member connected to the threaded fastener.
Figure 8:
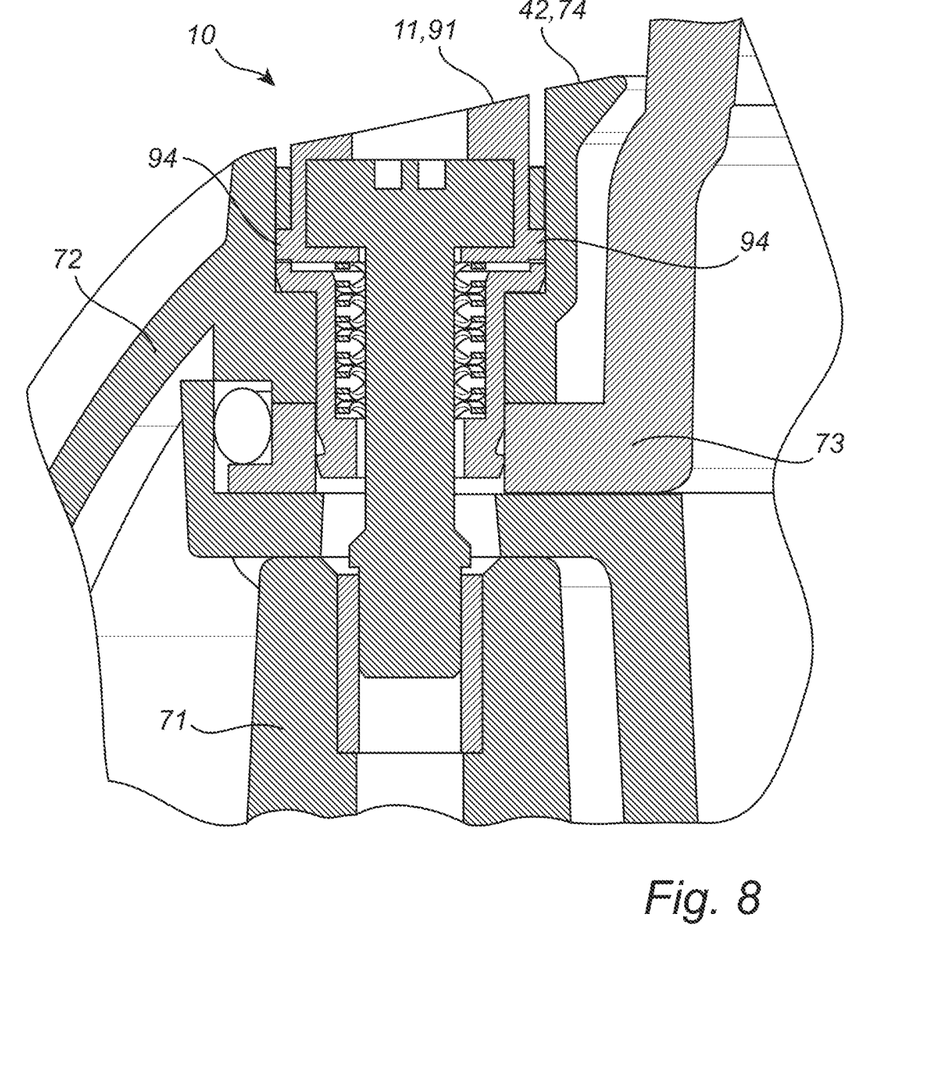
FIG. 8 is a detached cross-sectional view illustrating a camera device assembled by means of a threaded joint arrangement comprising a module of the type shown in FIG. 7.

Further, in the embodiments described above, the alignment surface 11 has been described as formed by the fastener head surface 23. It is understood that the alignment 11 surface may be provided in other ways. For instance, the alignment surface 11 may be formed by a top end surface 91 of an alignment member 90 connected to the threaded fastener 20, as illustrated in FIGS. 7 and 8.

The shown embodiment illustrates a threaded joint arrangement 10 of the module type described above with reference to FIG. 5 used for assembling a camera device of the type described with reference to FIG. 6.

In the shown embodiment, the alignment member 90 is formed by a hollow cylindrical cap 92 having a side opening 93 through which the fastener head 22 may be inserted into the interior of the cap 92.

In this embodiment, the first object 40 of the threaded joint arrangement 10 is formed by the sleeve 80 in combination with the annular collar 72. More specifically, the reference surface 42 of the first object 40 is formed by the upper surface 74 of the annular collar 72, which upper surface 74 is inclined.

In the shown embodiment, the threaded joint arrangement 10 further comprises two guides 94 (of which only one is shown in FIG. 7) that are provided on the exterior of the cap 92, which guides 94 are configured to be received by a respective groove 86 provided in the top portion of the sleeve 80 and extend in parallel with the longitudinal extension of the threaded fastener 20.

The alignment surface 11, i.e. the top end surface 91 of the cap 90, is inclined with an inclination corresponding to the inclination of the reference surface 42, as clearly seen in FIG. 8.

The provision of guides 94 received by the grooves 86 in the sleeve 80 ensures that the alignment surface 11 may be properly oriented relative the reference surface 42 during rotation of the threaded fastener 20.

In the shown embodiment, the alignment surface 11 has been moved to the second position in which it is flush with the inclined reference surface 42, thereby giving a visual and tactile indication that a tightening force of predetermined level has been applied to the threaded fastener 20.

It will be appreciated that the present invention is not limited to the embodiments shown. Several modifications and variations are thus conceivable within the scope of the invention which thus is exclusively defined by the appended claims.

The invention claimed is:

1. A threaded joint arrangement with visual and tactile indication of correct tightening force, the threaded joint arrangement comprising
   a threaded fastener having a fastener shaft and a fastener head,
   a biasing member,
   a first object provided with a cavity recessed in a reference surface of the first object, wherein the cavity has a bottom surface provided with a through hole, and
   a second object provided with a threaded hole,
   wherein the through hole is aligned with the threaded hole,
   wherein the threaded fastener is arranged such that the fastener shaft extends through the through hole and is in threaded engagement with the threaded hole of the second object,
   wherein the biasing member is arranged in the cavity between the fastener head and the bottom surface of the cavity,
   wherein the biasing member is configured to be compressed between the fastener head and the bottom surface of the cavity in response to rotation of the threaded fastener in a tightening direction,
   wherein an alignment surface of the threaded joint arrangement is movable by rotation of the threaded fastener between a first position in which the alignment surface is positioned outside the cavity, a second position in which the alignment surface is flush with the reference surface and a third position in which the alignment surface is positioned inside the cavity, and
   wherein the biasing member has a spring constant configured such that a tightening force of a predetermined level is obtained when the alignment surface is in the second position, wherein the alignment surface of the threaded joint arrangement extends in a plane parallel with the reference surface and wherein the alignment surface and the reference surface are mutually arranged such that the tightening force of the predetermined level is visually and tactilely determinable by observing and touching, respectively, the threaded joint arrangement and registering the flush relationship between the alignment surface and the reference surface.

2. The threaded joint arrangement according to claim 1, in which the alignment surface is a fastener head surface of the threaded fastener.

3. The threaded joint arrangement according to claim 1, in which the alignment surface is a top end surface of an alignment member connected to the threaded fastener.

4. The threaded joint arrangement according to claim 1, in which the first object and the second object are movable relative to each other by means of rotation of the threaded fastener such that a structure is clampable between the first and second objects.

5. The threaded joint arrangement according to claim 4, wherein the first object comprises a first engagement surface and the second object comprises a second engagement surface facing the first engagement surface, wherein, upon relative movement of the first and second objects towards each other by rotation of the threaded fastener in the tightening direction, the first engagement surface is configured for engagement with a first structure surface of the structure and the second engagement surface is configured for engagement with a second structure surface of the structure opposing the first structure surface.

6. The threaded joint arrangement according to claim 4, in which the second object is movable, by rotation of the threaded fastener in the tightening direction, from a mounting position in which the second object is positioned within a lateral periphery of the first object to a clamping position in which the second object extends beyond the lateral periphery of the first object, and in which the second object is relatively movable in a direction parallel with a longitudinal extension of the threaded fastener towards the first object upon continued rotation of the threaded fastener in the tightening direction.

7. The screw joint arrangement according to claim 1, in which the first object and the second object are configured to be pressed towards each other in response to compression of the biasing member by means of rotation of the threaded fastener in the tightening direction.

8. The threaded joint arrangement according to claim 1, in which a projection extends into the cavity from the bottom surface without interfering with the biasing member or the fastener shaft.

9. The threaded joint arrangement according to claim 1, in which the biasing member is a compression spring.

10. The threaded joint arrangement according to claim 9, wherein the compression spring is a wave spring.

11. The threaded joint arrangement according to claim 1, in which the fastener head surface is parallel with the reference surface.

12. The threaded joint arrangement according to claim 1, in which the reference surface is perpendicular to a longitudinal extension of the threaded fastener.

13. The threaded joint arrangement according to claim 1, in which the first object and/or the second object is made at least partly of a plastic material.

* * * * *